US006833945B2

(12) United States Patent
Fukumoto

(10) Patent No.: US 6,833,945 B2
(45) Date of Patent: Dec. 21, 2004

(54) RUBIDIUM TITANYL ARSENATE-SILVER GALLIUM SELENIDE TANDEM OPTICAL PARAMETRIC OSCILLATOR

(75) Inventor: Joseph M. Fukumoto, Rancho Palos Verdes, CA (US)

(73) Assignee: Raytheon Company, Waltham, MA (US)

( * ) Notice: Subject to any disclaimer, the term of this patent is extended or adjusted under 35 U.S.C. 154(b) by 316 days.

(21) Appl. No.: 10/045,814

(22) Filed: Jan. 15, 2002

(65) Prior Publication Data

US 2002/0097479 A1 Jul. 25, 2002

Related U.S. Application Data

(63) Continuation-in-part of application No. 09/478,229, filed on Jan. 6, 2000, now Pat. No. 6,344,920.

(51) Int. Cl.$^7$ .............................. G02F 1/39; G02F 2/02
(52) U.S. Cl. ....................................... 359/330; 359/326
(58) Field of Search ................................ 359/326–332; 372/21–22

(56) References Cited

U.S. PATENT DOCUMENTS

| | | | |
|---|---|---|---|
| 5,117,126 A | | 5/1992 | Geiger |
| 5,400,173 A | * | 3/1995 | Komine ..................... 359/330 |
| 5,740,190 A | * | 4/1998 | Moulton ..................... 372/23 |
| 6,167,067 A | | 12/2000 | Meyer, Jr. et al. |
| 6,215,800 B1 | | 4/2001 | Komine |
| 6,219,363 B1 | | 4/2001 | Fix et al. |
| 6,344,920 B1 | * | 2/2002 | Fukumoto ................... 359/330 |
| 6,639,921 B1 | * | 10/2003 | Fukumoto ................... 372/20 |

FOREIGN PATENT DOCUMENTS

WO   WO 01-50555 A   7/2001

WO   WO 01-82420 A   11/2001

OTHER PUBLICATIONS

Moore et al, "The Tandem Optical Parametric Oscillator", IEEE Journal of Quantum Electronics, vol. 32, no. 12, Dec. 1996, pp. 2085–2094.*
Chandra, S. et al.: "Continuously Tunable, 6–14 Mum Silver–Gallium Selenide Optical Parametric Oscillator Pumped at 1.57 Mum", Applied Physics Letters, American Institute of Physics, NY, US, vol. 71, no. 5, Aug. 4, 1997, pp. 584–586, XP000699619.
Moore, G. T. et al.: "A Simultaneously Phase–Matched Tandem Optical Parametric Oscillator" IEEE Journal of Quantum Electronics, IEEE, vol. 34, No. 5, May 1, 1998, pp. 803–810, XP000751982.

* cited by examiner

*Primary Examiner*—John D. Lee
(74) *Attorney, Agent, or Firm*—John E. Gunther; Leonard A. Alkov; William C. Schubert

(57) ABSTRACT

An arrangement (10) for efficiently generating tunable pulsed laser output at 8–12 microns. The arrangement (10) includes a laser (12), a first optical parametric oscillator (14) of unique design, and a second optical parametric oscillator (22). The first oscillator (14) is constructed with an energy shifting crystal (20) and first and second reflective elements (16) and (18) disposed on either side thereof. Energy from the laser (12) at a first wavelength is shifted by the crystal and output at a second wavelength. The second wavelength results from a secondary process induced by a primary emission of energy at a third wavelength, the third wavelength resulting from a primary process generated from the first wavelength in the crystal. Mirror coatings are applied on the reflective elements (16 and/or 18) for containing the primary emission and enhancing the secondary process. The second optical parametric oscillator (22) then shifts the energy output by the first OPO (14) at the second wavelength to the desired fourth wavelength.

49 Claims, 3 Drawing Sheets

RUBIDIUM TITANYL ARSENATE-SILVER GALLIUM SELENIDE TANDEM OPTICAL PARAMETRIC OSCILLATOR

CROSS-REFERENCE TO RELATED APPLICATIONS

This application is a continuation-in-part of U.S. patent application Ser. No. 09/478,229, entitled MONOLITHIC SERIAL OPTICAL PARAMETRIC OSCILLATOR filed Jan. 6, 2000, now U.S. Pat. No. 6,344,920. In addition, this application relates to copending application Ser. No. 09/939,004 entitled EFFICIENT ANGLE TUNABLE OUTPUT FROM A MONOLITHIC SERIAL KTA OPTICAL PARAMETRIC OSCILLATOR, filed Aug. 24, 2001.

BACKGROUND OF THE INVENTION

1. Field of the Invention

The present invention relates to solid state lasers and frequency shifting of laser output. More specifically, the present invention relates to frequency shifted solid state laser output operative in the 8–12 micron range.

2. Description of the Related Art

Lasers are currently widely used for communication, research and development, manufacturing, directed energy and numerous other applications. For many applications, the energy efficiency, power and light weight of solid state lasers make these devices particularly useful. Because only a few crystals lase and each crystal lases at a unique fundamental frequency, the wavelengths which can be generated by a laser are limited.

Solid state lasers currently lase in the range of one to three microns. For certain applications, there is a need to reach longer laser operating wavelengths. In particular, there is interest in the 8–12 micron ($\mu$m) region. A system which can generate pulsed, tunable radiation at these wavelengths is particularly useful for the remote detection of chemical agents and other chemical species. Unfortunately, the 8–12 $\mu$m region is a very difficult wavelength region to access. No current solid-state laser source is capable of emitting pulsed, tunable laser output in this region.

Wavelength conversion of commonly available 1 micron lasers to the 8–12 micron region using optical parametric oscillators (OPOs) and difference frequency generation (DFG) has been demonstrated, but the overall energy conversion efficiencies were low. See for example: 1) S. Chandra, T. H. Allik, G. Catella, R. Utano, J. A. Hutchinson, "Continuously tunable 6–14 $\mu$m silver gallium selenide optical parametric oscillator pumped at 1.57 $\mu$m," Appl. Phys. Lett. 71, 584–586 (1997); and 2) R. Utano and M. J. Ferry, "8–12 $\mu$m generation using difference frequency generation in AgGaSe$_2$ of a Nd:YAG pumped KTP OPO," in *Advanced Solid State Lasers, OSA Trends in Optics and Photonics* (Optical Society of America, Washington, D.C., 1997), Vol. 10, pp. 267–269.

One approach involved the use of a 1 micron laser to pump a potassium titanyl phosphate (KTP) OPO, whose signal wave output at 1.57 microns was then used to pump a silver gallium selenide (AgGaSe$_2$) OPO to produce 6–14 micron output. Optical parametric oscillators (OPOs) have been widely used to shift the fundamental output of a laser from one wavelength to another through the use of a nonlinear crystal. Unfortunately, the use of OPOs limits the efficiency of the system. This is due to the fact that the energy in the input laser beam is split between plural output beams. In the described system, the KTP OPO output is a less than optimal pump source for the AgGaSe$_2$ OPO.

Hence, a need remains in the art for an efficient, tunable system or method for converting the output of a typical 1 $\mu$m laser to the 8–12 $\mu$m range.

SUMMARY OF THE INVENTION

The need in the art is addressed by the present invention, a novel system and method for efficiently generating tunable pulsed laser output at 8–12 microns by converting the output of a standard 1 micron laser using a serial optical parametric oscillator (OPO) conversion scheme which uses the nonlinear crystals rubidium titanyl arsenate (RTA) and silver gallium selenide (AgGaSe$_2$). This system can generate tunable 8–12 micron output in a more efficient manner than that which has been previously demonstrated. A key aspect of this approach is the use of the RTA OPO to produce a secondary signal output at 3.01 microns with greater than 25% overall 1 micron to 3.01 micron conversion efficiency.

The system includes a laser, a first optical parametric oscillator of unique design, and a second optical parametric oscillator. The first oscillator is constructed with an energy shifting crystal and first and second reflective elements disposed on either side thereof. Energy from the laser at a first wavelength is shifted by the crystal and output at a second wavelength. The second wavelength results from a secondary process induced by a primary emission of energy at a third wavelength, the third wavelength resulting from a primary process generated from the first wavelength in the crystal. Mirror coatings are applied on the reflective elements for containing the primary emission and enhancing the secondary process. The second optical parametric oscillator then shifts the energy output by the first OPO at the second wavelength to the desired fourth wavelength. In the illustrative embodiment, the first optical parametric oscillator includes an x-cut rubidium titanyl arsenate crystal and the second optical parametric oscillator includes a silver gallium selenide crystal. The first wavelength is approximately 1.06 microns, the second wavelength is approximately 3.01 microns, the third wavelength is approximately 1.61 microns, and the fourth wavelength is in the range of 8–12 microns.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention provides a novel system and method for generating tunable pulsed laser output at 8–12 microns by converting the output of a standard 1 micron laser using a serial optical parametric oscillator (OPO) conversion scheme which uses the non-linear crystals rubidium titanyl arsenate (RTA) and silver gallium selenide (AgGaSe$_2$). This system can generate tunable 8–12 micron output in a more efficient manner than that which has been previously demonstrated.

Figure 1:
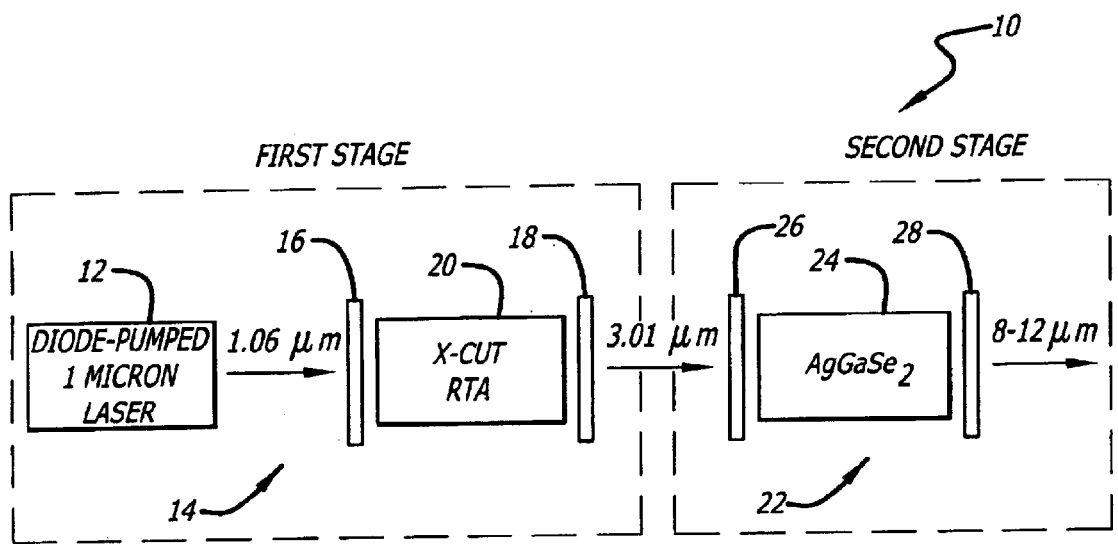
FIG. 1 is a diagram depicting a laser-based system for generating 8–12 micron wavelengths in accordance with the teachings of the present invention.

FIG. 1 is a diagram depicting a laser-based system for generating 8–12 micron wavelengths in accordance with the teachings of the present invention. The system 10 is comprised of two stages. In the first stage, a 1 micron laser 12, such as a diode pumped Neodymium-Ytterbium Aluminum Garnet (Nd:YAG) laser, outputs a collimated beam of electromagnetic energy at a fundamental frequency of 1.06 μm. This 1.06 μm beam is applied to an RTA OPO 14 consisting of an x-cut RTA crystal 20 sandwiched between a rear high reflector 16 and an output coupler 18. In the second stage, the 3.01 μm beam output from the RTA OPO 14 is applied to an AgGaSe$_2$ OPO 22 consisting of a Type II phase matched AgGaSe$_2$ crystal 24 sandwiched between a rear high reflector 26 and an output coupler 28, producing 8–12 μm output.

A 3.01 μm narrow band pass filter (not shown) can be placed between the first and second stages to prevent the 3.15 μm and 3.45 μm waves from pumping the second stage.

A key aspect of this approach is the use of the RTA OPO 14 to produce a secondary signal output at 3.01 microns with greater than 25% overall 1 micron to 3.01 micron conversion efficiency. Direct lasing output at 3 microns has proven to be inefficient. Using a well-designed 1 micron diode-pumped solid-state laser and an RTA OPO optimized to produce a secondary signal wave, an efficient 3.01 micron laser source will result.

The first stage conversion strategy has been described in detail for potassium titanyl arsenate (KTA) in the above-identified parent application (U.S. patent application Ser. No. 09/478,229, entitled MONOLITHIC SERIAL OPTICAL PARAMETRIC OSCILLATOR filed Jan. 6, 2000, by J. M. Fukumoto (Atty. Docket No. PD 99W073). A similar approach can be used with RTA to design an OPO optimized to produce a secondary signal wave at 3.01 μm.

Figure 2:
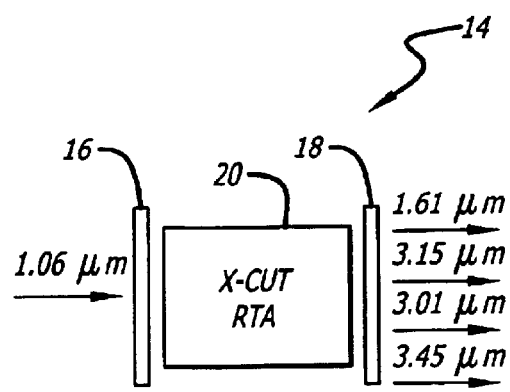
FIG. 2 is an illustration showing the wavelengths generated by the first stage OPO depicted in FIG. 1.

FIG. 2 is an illustration showing the wavelengths generated by the RTA OPO 14 depicted in FIG. 1.

As is known in the art, in response to the application of a 1.06 μm pump beam thereto, the RTA crystal 20 generates a 1.61 μm signal wave and 3.15 μm idler wave. This is known as the 'primary process'.

However, not generally known in the art is the fact that as a result of this primary process, which is a serial process, a 'secondary process' occurs and is due to the feedback of the 1.61 μm wave into the crystal by the reflectors 16 and 18 at the x-cut angle, an angle along one of the primary axes of the crystal. The secondary OPO process produces distinct signal and idler waves that are of longer wavelengths than those of the first OPO process. This is due to the fact that even a small amount of reflectivity (i.e., <10%) from either the crystal anti-reflection coatings or the OPO mirrors at the secondary OPO signal wavelength can initiate oscillations at the secondary signal wavelength due to high gain and large acceptance angles of the secondary process. The crystal responds by generating the secondary signal and idler waves.

Figure 3:
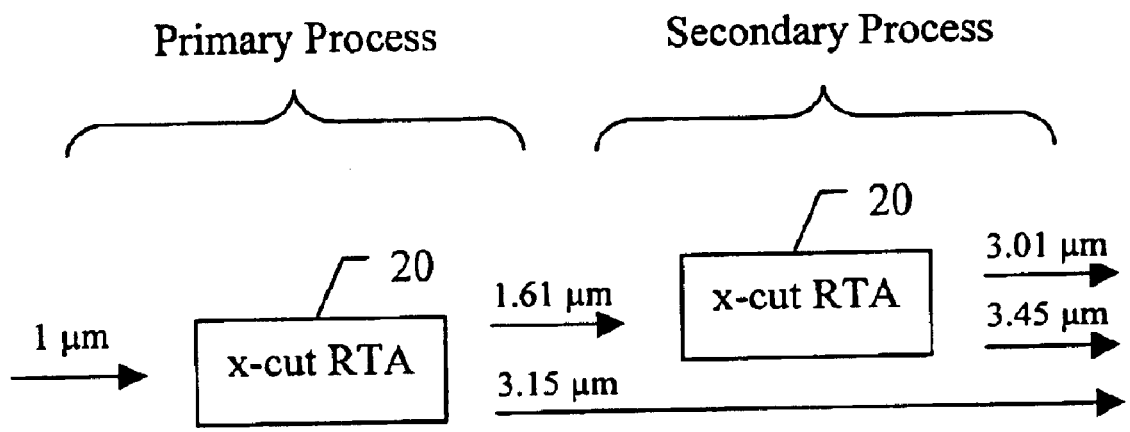
FIG. 3 is an illustration showing the secondary process caused by the primary process in the first stage OPO.

In the RTA crystal, the secondary process transforms some fraction of the 1.61 μm signal wave of the primary OPO process into secondary signal and idler waves at 3.01 μm and 3.45 μm, respectively. This is shown in the simplified diagram of FIG. 3, which depicts the newly discovered secondary process caused by the primary process in the first stage RTA OPO 14. In FIG. 3, the laser 12 and the reflective elements 16 and 18 have been omitted for clarity.

In FIG. 3, note that only a single crystal 20 is used, not two separate crystals. Nonetheless, those skilled in the art will appreciate that the present teachings may be extended to any number of mediums or crystals arranged in serial (cascade) or parallel configurations or any combination thereof without departing from the scope of the present teachings.

Robust, tunable output at the wavelengths of the secondary process can be generated by maximizing the secondary OPO process (at the expense of th signal wave of the first process) through conscientious design of OPO mirror coatings. This is described more fully in the above-identified co-pending application Ser. No. 09/939,004, entitled EFFICIENT ANGLE TUNABLE OUTPUT FROM A MONOLITHIC RIAL KTA OPTICAL PARAMETRIC OSCILLATOR, filed Aug. 24, 2001, the teachings of which are hereby incorporated herein by reference.

Figure 4:
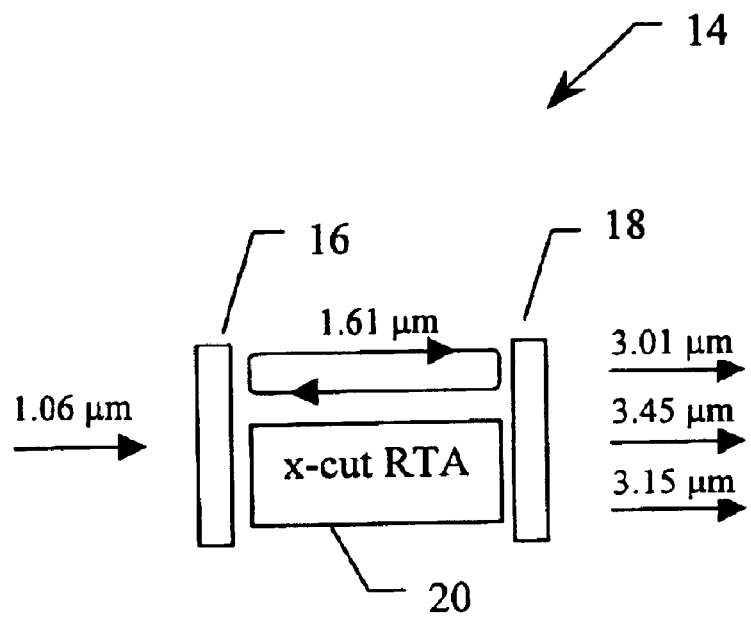
FIG. 4 is an illustration showing containment of the first process signal wave.

FIG. 4 is an illustration showing containment of the first process signal wave. The first process signal wave can be fully contained by the RTA OPO 14 by specifying high reflectivity at the first signal wavelength 1.61 μm and minimal reflectivity at the primary and secondary idler waves at 3.15 μm and 3.45 μm for both the rear reflector 16 and output coupler 18. The rear high reflector 16 should be highly reflective at 3.01 μm and highly transmissive at the pump wavelength of 1.06 μm. The output coupler 18 needs partial reflectivity at 3.01 μm in order to resonate the secondary signal wave for efficient 1 μm to 3.01 μm conversion. In this manner, the 1.61 μm pump wave for the secondary process is fully contained while the 3.01 μm signal wave for the secondary process is allowed to oscillate.

Figure 5:
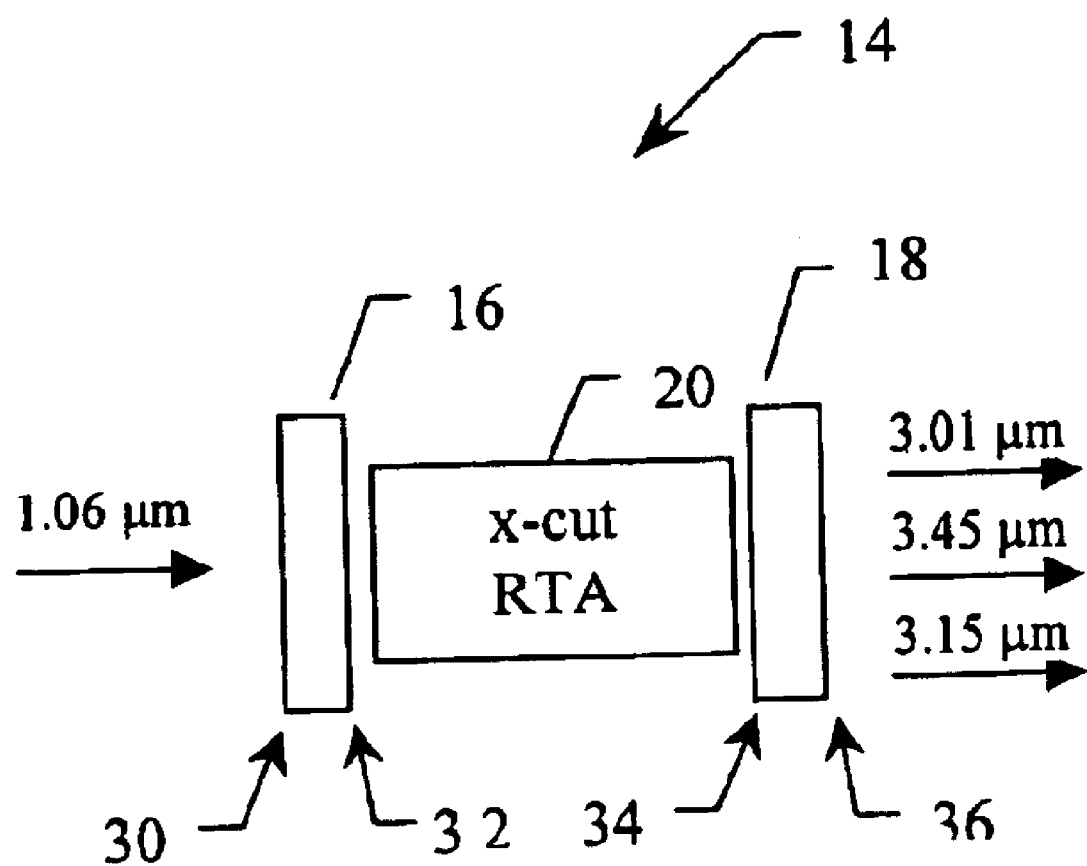
FIG. 5 is a diagram showing an RTA OPO for efficient generation of 3.01 $\mu$m output designed in accordance with teachings of the present invention.

FIG. 5 is a diagram showing a preferred embodiment of the RTA OPO 14 for efficient generation of 3.01 μm output designed in accordance with teachings of the present invention. The OPO 14 includes a Type II x-cut (θ=90°, φ=0°) RTA crystal 20 sandwiched between a rear high reflector 16 and an output coupler 18. The reflective elements 16 and 18 are coated to contain or emit energy at desired wavelengths. Those skilled in the art will be able to design reflective elements using optical thin films or other techniques known in the art and the invention is not limited to the design thereof. The rear reflector 16 has a first side 30 which receives the 1 μm pump beam, and a second side 32 which faces the crystal 20. The output coupler 18 a first side 34 which faces the crystal 20, and a second side 36 which faces the direction of the output beam.

In order to optimize the secondary process for the 3.01 μm secondary signal wave, the following coating specifications should be used:

Rear high reflector 16, first side 30: anti-reflective (greater than 99% transmissive) coating at 1.064 μm, 0° incidence; greater than 90% transmission at 3.15 μm, 0° incidence; greater than 90% transmission at 3.45 μm, 0° incidence.

Rear high reflector 16, second side 32: greater than 97% transmission at 1.064 μm, 0° incidence; greater than 99% reflection at 1.61 μm, 0° incidence; greater than 99% reflection at 3.01 μm, 0° incidence; greater than 90% transmission at 3.15 μm, 0° incidence; greater than 90% transmission at 3.45 μm, 0° incidence.

Output coupler 18, first side 34: 98–99% reflection at 1.61 μm, 0° incidence; 50% reflection at 3.01 μm, 0° incidence; greater than 90% transmission at 3.15 μm, 0° incidence; greater than 90% transmission at 3.45 μm, 0° incidence.

Output coupler 18, second side 36: greater than 99% reflection at 1.064 μm, 0° incidence; greater than 97% transmission at 3.01 μm, 0° incidence; greater than 90% transmission at 3.15 μm, 0° incidence; greater than 90% transmission at 3.45 μm, 0° incidence.

The 1.064 μm high reflector coating on the second side 36 of the output coupler 18 allows double pass pumping of the primary process while relieving the first side 30 of the rear reflector 16 from a second high reflective coating band.

The above mirror specifications are for a preferred embodiment of the present invention. The specifications need not be exactly those listed. The general strategy is to minimize reflectivity at 3.15 μm and 3.45 μm, while fully containing the 1.61 μm wave, and allowing partial reflectivity for the 3.01 μm wave.

In the preferred embodiment, the reflector 16 and coupler 18 are optical thin films disposed on a substrate to provide a mirrored surface. Those skilled in the art will appreciate that any suitable thin film design may be used for this purpose.

The described RTA OPO 14 can be used to produce a secondary signal output at 3.01 μm with greater than 25% overall 1 μm to 3.01 μm conversion efficiency. The 3.01 μm output can then be used to pump a second OPO 22 to produce tunable 8–12 μm output as shown in FIG. 1. The efficient conversion of the 1 μm output to 3.01 μm by use of the secondary signal wave in RTA allows the overall 1 μm to 8–12 μm process to proceed efficiently.

In the illustrative embodiment, the second OPO 22 uses a silver gallium selenide ($AgGaSe_2$) crystal 24. Those skilled in the art will appreciate that any suitable crystal may be used for this purpose. For example, a CGA crystal can also be used to generate efficient 8–12 μm tunable radiation when pumped by an efficient 3.01 μm source.

The characteristics of a Type II $AgGaSe_2$ OPO 22 pumped at 3.01 μm were derived through computer simulation and are summarized below in Table 1.

application. Those having ordinary skill in the art and access to the present teachings will recognize additional modifications, applications and embodiments within the scope thereof. For example, the present teachings are not limited to the use of optical thin film reflective elements. Any surface which serves to eliminate unwanted energy from the medium may be used for this purpose.

It is therefore intended by the appended claims to cover any and all such applications, modifications and embodiments within the scope of the present invention.

Accordingly,
What is claimed is:

1. An arrangement comprising:
    first means for shifting energy received at a first wavelength and outputting said shifted energy at a second wavelength, said second wavelength resulting from a secondary process induced by a primary emission of energy at a third wavelength, said third wavelength resulting from a primary process generated from said first wavelength by said first means;
    second means disposed in functional alignment with said first means for containing said primary emission and enhancing said secondary process thereby; and
    third means for shifting energy received at said second wavelength and outputting said shifted energy at a fourth wavelength, said primary process generating an additional emission of energy at a fifth wavelength.

2. The invention of claim 1 wherein said second mean includes first and second reflective means.

3. The invention of claim 2 wherein said first and second reflective means have high reflectivity at said third wavelength of the primary emission.

4. The invention of claim 2 wherein said first reflective means has high reflectivity at said second wavelength of the secondary emission.

5. The invention of claim 2 wherein said second reflective means is partially transmissive at said second wavelength with a predetermined reflectivity.

6. The invention of claim 5 wherein said predetermined reflectivity is about fifty percent.

7. The invention of claim 2 wherein said first and second reflective means have low reflectivity at said fifth wavelength.

TABLE 1

| signal λ (μm) | idler λ (μm) | idler/pump walk-off (mrad) | theta (degrees) | deff (pm/V) | gain coefficient (/sqrt Watt) | crystal angular tolerance (mrad-cm) | OPO acceptance angle (mrad-cm) | OPO acceptance BW (cm-1-cm) |
|---|---|---|---|---|---|---|---|---|
| 4.8 | 8.0 | 11.90/11.36 | 55.5 | 3.20E+01 | 2.11E−04 | 16.70 | 26.05 15.49 | 53.83 |
| 4.5 | 9.0 | 12.28/11.66 | 53.3 | 3.28E+01 | 2.11E−04 | 15.21 | 28.42 14.06 | 69.25 |
| 4.3 | 10.0 | 12.48/11.79 | 52.2 | 3.32E+01 | 2.08E−04 | 14.29 | 31.12 13.16 | 104.12 |
| 4.1 | 11.0 | 12.58/11.85 | 51.7 | 3.34E+01 | 2.03E−04 | 13.66 | 34.04 12.57 | 261.98 |
| 4.0 | 12.0 | 12.59/11.85 | 51.7 | 3.34E+01 | 1.98E−04 | 13.21 | 37.19 12.17 | 318.71 |

With an internal angular range of 3.8 degrees, the idler wave output from the $AgGaSe_2$ OPO 22 can cover the full 8–12 μm region. Walk-off losses can be minimized by using the shortest $AgGaSe_2$ crystal possible in the OPO with the largest possible pump beam waist consistent with OPO threshold considerations. In addition, the signal output from the OPO spanning the 4.0–4.8 μm range can be useful for infrared countermeasure applications and/or biological agent detection.

Thus, the present invention has been described herein with reference to a particular embodiment for a particular 8. The invention of claim 2 wherein said secondary process generates an additional emission of energy at a sixth wavelength.

9. The invention of claim 8 wherein said first and second reflective means have low reflectivity at said sixth wavelength.

10. The invention of claim 8 wherein said first and second reflective means are first and second mirrors.

11. The invention of claim 10 wherein said first mirror includes a first surface and a second surface.

12. The invention of claim 11 wherein said first surface of said first mirror has greater than 99% transmission at said first wavelength; greater than 90% transmission at said fifth wavelength; and greater than 90% transmission at said sixth wavelength.

13. The invention of claim 11 wherein said second surface of said first mirror has greater than 97% transmission at said first wavelength; greater than 99% reflection at said third wavelength; greater than 99% reflection at said second wavelength; greater than 90% transmission at said fifth wavelength; and greater than 90% transmission at said sixth wavelength.

14. The invention of claim 10 wherein said second mirror includes a first surface and a second surface.

15. The invention of claim 14 wherein said first surface of said second mirror has 98–99% reflection at said third wavelength; 50% reflection at said second wavelength; greater than 90% transmission at said fifth wavelength; and greater than 90% transmission at said sixth wavelength.

16. The invention of claim 14 wherein said first surface of said second mirror has greater than 99% reflection at said first wavelength; greater than 97% transmission at said second wavelength; greater than 90% transmission at said fifth wavelength; and greater than 90% transmission at said sixth wavelength.

17. The invention of claim 1 wherein said first means is a crystal.

18. The invention of claim 17 wherein said crystal is X cut.

19. The invention of claim 17 wherein said crystal is rubidium titanyl arsenate (RTA).

20. The invention of claim 19 wherein said first wavelength is approximately 1.06 microns, said second wavelength is approximately 3.01 microns and said third wavelength is approximately 1.61 microns.

21. The invention of claim 1 wherein said third means includes an optical parametric oscillator.

22. The invention of claim 21 wherein said optical parametric oscillator includes a silver gallium selenide crystal.

23. The invention of claim 1 wherein said fourth wavelength is in the range of 8–12 microns.

24. A mechanism for outputting energy comprising:
a laser for generating energy at a first wavelength;
a first optical parametric oscillator for shifting the energy output by said laser to a second wavelength, said first optical parametric oscillator including:
 a crystal adapted to shifting energy received from said laser at said first wavelength and outputting said shifted energy at said second wavelength, said second wavelength resulting from a secondary process induced by a primary emission of energy at a third wavelength, said third wavelength resulting from a primary process generated from said first wavelength by said crystal, and
 a mechanism disposed in functional alignment with said crystal for containing said primary emission and enhancing said secondary process thereby; and
a second optical parametric oscillator for shifting the energy output by said first optical parametric oscillator to a fourth wavelength, said first wavelength being approximately 1.06 microns, said second wavelength being approximately 3.01 microns and said third wavelength being approximately 1.61 microns.

25. A system for outputting energy in the 8–12 $\mu$m region comprising:
a laser for generating energy at 1.06 $\mu$m;
a first optical parametric oscillator for shifting the energy output by said laser to 3.01 $\mu$m, said first optical parametric oscillator including:
 an x-cut rubidium titanyl arsenate crystal adapted to shifting energy received from said laser at 1.06 $\mu$m and outputting said shifted energy at 3.01 $\mu$m, said 3.01 $\mu$m wavelength resulting from a secondary process induced by a primary emission of energy at 1.61 $\mu$m said 1.61 $\mu$m wavelength resulting from a primary process generated from said 1.06 $\mu$m wavelength by said crystal, and
 a mechanism disposed in functional alignment with said crystal for containing said primary emission and enhancing said secondary process thereby; and
a second optical parametric oscillator for shifting the energy output by said first optical parametric oscillator to 8–12 microns, wherein said second optical parametric oscillator includes a silver gallium selenide crystal.

26. A method for efficiently generating energy at a desired fourth wavelength including the steps of:
generating energy at a first wavelength;
shifting said energy at said first wavelength and outputting said shifted energy at a second wavelength, said second wavelength resulting from a secondary process induced by a primary emission of energy at a third wavelength, said third wavelength resulting from a primary process generated from said first wavelength;
containing said primary emission and enhancing said secondary process thereby; and
shifting said energy at said second wavelength and outputting said shifted energy at a fourth wavelength, said primary process generating an additional emission of energy at a fifth wavelength.

27. An arrangement comprising:
first means for shifting energy received at a first wavelength and outputting said shifted energy at a second wavelength, said second wavelength resulting from a secondary process induced by a primary emission of energy at a third wavelength, said third wavelength resulting from a primary process generated from said first wavelength by said first means, said first means including a rubidium titanyl arsenate crystal;
second means disposed in functional alignment with said first means for containing said primary emission and enhancing said secondary process thereby; and
third means for shifting energy received at said second wavelength and outputting said shifted energy at a fourth wavelength.

28. An arrangement comprising:
first means for shifting energy received at a first wavelength and outputting said shifted energy at a second wavelength, said second wavelength resulting from a secondary process induced by a primary emission of energy at a third wavelength, said third wavelength resulting from a primary process generated from said first wavelength by said first means;
second means disposed in functional alignment with said first means for containing said primary emission and enhancing said secondary process thereby; and
third means for shifting energy received at said second wavelength and outputting said shifted energy at a fourth wavelength, said first wavelength being approximately 1.06 microns, said second wavelength being approximately 3.01 microns and said third wavelength being approximately 1.61 microns.

29. The invention of claim 28 wherein said second means includes first and second reflective means.

30. The invention of claim 29 wherein aid first and second reflective means have high reflectivity at said third wavelength of the primary emission.

31. The invention of claim 29 wherein said first reflective means has high reflectivity at said second wavelength of the secondary emission.

32. The invention of claim 29 wherein said second reflective means is partially transmissive at said second wavelength with a predetermined reflectivity.

33. The invention of claim 32 wherein said predetermined reflectivity is about fifty percent.

34. The invention of claim 29 wherein said primary process generates an additional emission of energy at a fifth wavelength.

35. The invention of claim 34 wherein said first and second reflective means have low reflectivity at said fifth wavelength.

36. The invention of claim 34 wherein said secondary process generates an additional emission of energy at a sixth wavelength.

37. The invention of claim 36 wherein said first and second reflective means have low reflectivity at said sixth wavelength.

38. The invention of claim 36 wherein said first and second reflective means are first and second mirrors.

39. The invention of claim 38 wherein said first mirror includes a first surface and a second surface.

40. The invention of claim 39 wherein said first surface of said first mirror has greater than 99% transmission at said first wavelength; greater than 90% transmission at said fifth wavelength; and greater than 90% transmission at said sixth wavelength.

41. The invention of claim 39 wherein said second surface of said first mirror has greater than 97% transmission at said first wavelength; greater than 99% reflection at said third wavelength; greater than 99% reflection at said second wavelength; greater than 90% transmission at said fifth wavelength; and greater than 90% transmission at said sixth wavelength.

42. The invention of claim 38 wherein said second mirror includes a first surface and a second surface.

43. The invention of claim 42 wherein said first surface of said second mirror has 98–99% reflection at said third wavelength; 50% reflection at said second wavelength; greater than 90% transmission at said fifth wavelength; and greater than 90% transmission at said sixth wavelength.

44. The invention of claim 42 wherein said first surface of said second mirror has greater than 99% reflection at said first wavelength; greater than 97% transmission at said second wavelength; greater than 90% transmission at said fifth wavelength; and greater than 90% transmission at said sixth wavelength.

45. The invention of claim 28 wherein said first means is a crystal.

46. The invention of claim 45 wherein crystal is X cut.

47. The invention of claim 45 wherein said crystal is rubidium titanyl arsenate (RTA).

48. The invention of claim 28 wherein said third means includes an optical parametric oscillator.

49. The invention of claim 48 wherein said optical parametric oscillator includes a silver gallium selenide crystal.

* * * * *